Sept. 29, 1959 F. FAHNOE ET AL 2,906,682

INFORMATION STORAGE SYSTEMS AND METHODS FOR PRODUCING SAME

Filed Sept. 9, 1954

INVENTORS.
FREDERICK FAHNOE
JAMES J. SHYNE &
BY WILSON O. FLETCHER

Campbell, Brumbaugh, Free & Graves
their ATTORNEYS

United States Patent Office 2,906,682

Patented Sept. 29, 1959

2,906,682

INFORMATION STORAGE SYSTEMS AND METHODS FOR PRODUCING SAME

Frederick Fahnoe, Morristown, James J. Shyne, Arlington, and Wilson D. Fletcher, Bloomfield, N.J., assignors to Vitro Corporation of America, Verona, N.J.

Application September 9, 1954, Serial No. 455,084

4 Claims. (Cl. 204—181)

Our invention relates to information storage systems and methods for producing same.

The prior art has knowledge of information storage systems which utilize a plurality of ferrite memory elements or cores in operative relationship. Such cores have many desirable electromagnetic properties, but at the present time are both costly and difficult to produce.

For example, in a typical production operation, ferrite material (i.e., ferromagnetic ceramic compositions containing the oxides of such metals as iron, magnesium, nickel and chromium) is molded into individual small toroid shaped cores. Each core is then heat treated and subsequently tested to determine whether its electromagnetic properties are acceptable. The rejection rate at this point is very high, ranging upward to about 70% of the cores tested. The acceptable cores are then arranged in flat arrays and electrically wired together. A typical array will contain 1024 cores and require a minimum of 40 man-hours for assembly. The array is again tested and all unacceptable cores are removed and replaced. The tested arrays are then arranged into array banks, and after further wiring and assembly, are ready for use in an information storage system.

We have discovered that, by constructing ferrite cores in a different manner than heretofore known, we can form an array of cores in one operation and thus obtain great reductions in cost and assembly time. Moreover, the electro-magnetic properties of these cores are extremely uniform, thus permitting a substantial reduction in the core rejection rate.

Accordingly, it is an object of the present invention to provide new products and processes of the character indicated.

Another object is to provide a novel ferrite core comprising a non-conductive core base coated with ferrite material.

A further object is to provide a novel process for producing ferrite cores through the use of electrophoretic deposition.

Yet another object is to provide a novel core array utilizing cores comprising a non-conductive core base coated with ferrite material and inter-connected in a printed circuit arrangement.

In accordance with the invention, one or more selected areas designated as core receiving areas and located on the upper surface of an electrically non-conductive core base plate are rendered conductive. A ferrite coating of desired thickness is then deposited solely on each of these conductive surfaces to form a core, and the coated plate is heated to sinter this core and bond same to the core base plate. In this manner, an entire core array can be produced simultaneously. The cores can subsequently be interconnected by drilling holes in the plate as desired. Alternatively, the base plate can be prepared in accordance with conventional printed circuit techniques before the cores are formed, so that the sintering step is the final step necessary to produce a completed core array.

Several methods for depositing the ferrite material on the selected areas of the core plate are available. If the final use is such that a relatively large variation in the electromagnetic properties of the cores is tolerable, the ferrite material can be dispersed in liquid media and applied by spraying, dipping, painting or other conventional techniques.

However, when only extremely small variations in these properties can be tolerated, the ferrite material must be deposited electrophoretically out of liquid media onto the selected areas.

Electrophoretic deposition occurs when an electrostatic field is established between two electrodes immersed within a colloidal or gross dispersion of charged particles, thus causing migration of the suspended particles toward one of the electrodes and producing a deposit of an adherent coating upon that electrode. Exceptional uniformity of coating thickness and compactness (with a relatively high coating density) are obtained as compared with dipping, spraying, brushing and other more conventional methods of application. Irregularly shaped objects can be coated with excellent uniformity and reproducibility of coating. Further details of this process will be found in application Serial No. 386,882, filed October 19, 1953, and Serial No. 388,119, filed October 26, 1953, by F. Fahnoe and J. J. Shyne, now Patent Nos. 2,848,391 and 2,858,256, respectively.

The following examples set forth certain well-defined instances of the application of this invention. They are, however, not to be considered limitations thereof, since many modifications can be made without departing from the spirit and scope of this invention.

In the description which follows, reference is made to the drawings for clarity.

*Example I*

Figure 1:
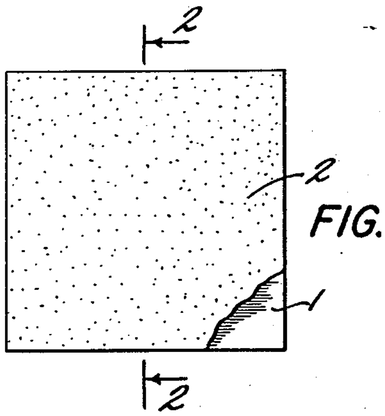
Figure 1 represents a plan view, partly cut away, of a ceramic plate, after spraying with conducting material.
Figure 2:
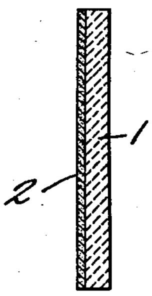
Figure 2 is a view in cross-section of the plate of Figure 1, looking in the direction of the arrows along the line 2—2 of Figure 1.
Figure 3:
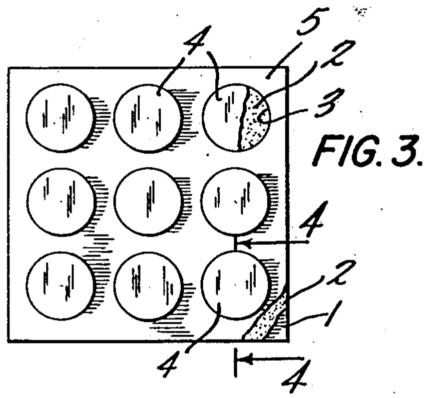
Figure 3 is a plan view, partly cut away, of the plate of Figure 1, after adding masking tape in selected core-receiving areas and then spraying with lacquer.
Figure 4:
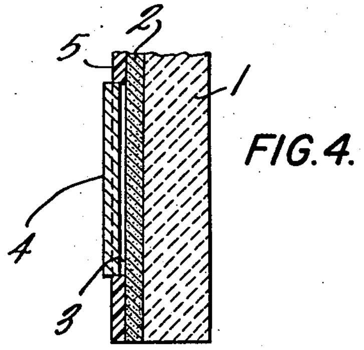
Figure 4 is a view in cross-section of the plate of Figure 3, looking in the direction of the arrows along the line 4—4 of Figure 3.

The upper surface of a thin ceramic plate (designated 1 in Figures 1 and 2) was sprayed with an aqueous solution of stannic chloride in 60% concentration to render this surface conductive, thus forming a continuous coating 2. The selected core receiving areas (designated 3 in Figures 3 and 4) were covered with masking tape 4 and then the entire upper surface was sprayed with the residue-free lacquer commercially designated as Glyptal thus forming a continuous coating 5. The masking tape was then removed, leaving the conductive core receiving areas exposed.

Figure 5:
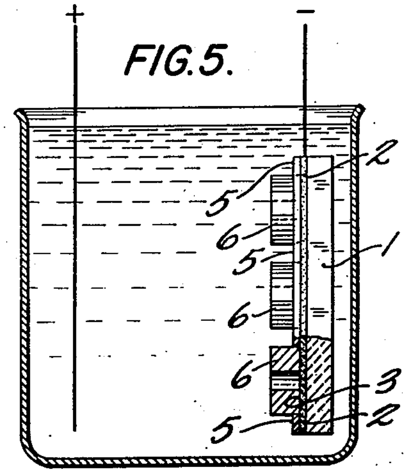
Figure 5 is a side view in vertical section of an electrolytic cell, with the plate of Figures 3 and 4 mounted for electrolytic deposition of ferrite thereon.

A 5% concentration by weight of commercially prepared ferrite material dispersed in isopropyl alcohol was prepared and this material was then electro-phoretically deposited (using an electrolytic cell as shown in Figure 5)

out of this solution onto the conductive core receiving areas in the manner described in the above-mentioned S.N. 386,882 and 388,119, the resultant coatings 6 being 0.05 inch thick.

The coated plate was then heated in air to a temperature of 1200° C. for a period of 15 minutes to sinter and bond the ferrite material to the ceramic plate and simultaneously vaporize and drive off all remaining lacquer and stannic chloride residue.

The ferrite coatings thus produced were extremely uniform; the difference in thickness between the thickest core and the thinnest core being less than 2%.

Figures 6, 7:
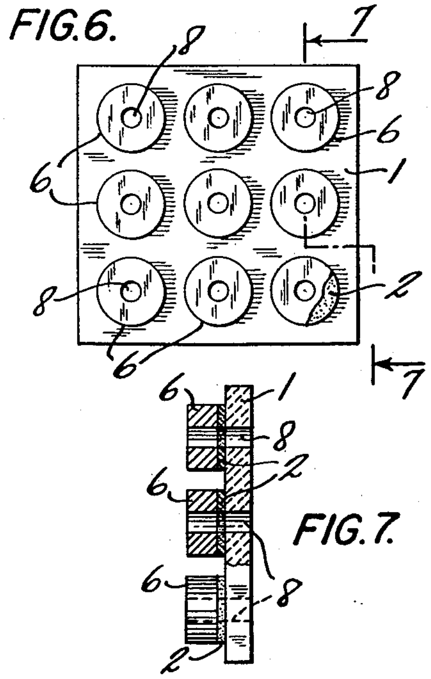
Figure 6 is a plan view, partly cut away, of the plate of Figure 3, as completed with a ferrite memory array.
Figure 7 is a view broken away in vertical section of the plate of Figure 6, taken along the line 7—7 looking in the direction of the arrows.

In order to produce a completed array, holes 8 were bored through the cores, thus forming the plate of Figures 6 and 7 and the ceramic plate and the cores were electrically wired together.

*Example II*

Selected areas on the upper surface of a thin ceramic plate were designated as core receiving areas, and these areas were electrically connected together by conductive paths laid down on the plate through the use of standard printed circuit techniques. These areas only were then sprayed with stannic chloride as before to render same conductive.

Ferrite material was then electrophoretically deposited on these areas as described previously. The plate was again heated to a temperature of 1000° C. for a period of 15 minutes in order to drive off all chloride residue and to sinter and bond the ferrite material to the plate, thus producing the completed array.

*Example III*

Example I was repeated in the same manner except that the ferrite material was sprayed (not electrophoretically deposited) on the core receiving areas. The thickness of the coatings thus produced were less uniform than those produced in Example I; the difference in thickness between the thickest coating and the thinnest coating being on the order of 20%. The coatings were less securely bonded to the plate and could be removed through the use of a hammer and chisel.

The ferrite material used in the above examples was composed of a mixture of ferric oxide and nickel oxide present in a 1:1 ratio by molecular weight. However, any ferrite material can be used, as long as the material has been previously treated in conventional manner to provide the desired molecular orientation.

While we have shown and pointed out and described the fundamental novel features of the invention, it will be understood that various omissions and substitutions and changes can be made by those skilled in the art without departing from the spirit of the invention. It is our intention, therefore, to be limited only as indicated by the scope of the claims which follow.

We claim:

1. The method of producing an information storage array which comprises the steps of rendering conductive a plurality of physically separated selected portions of an exposed surface of an electrically non-conductive plate; electrophoretically depositing ferrite material on said portions to form simultaneously a like plurality of ferrite cores thereon; and heating said cores and plate to sinter said cores and bond said cores to said plate.

2. The method as set forth in claim 1 further including the step of electrically interconnecting said cores.

3. The method of forming an information storage array from an electrically non-conductive plate provided with a network of electrically conductive paths imprinted thereon and extending between a plurality of selected areas on one exposed surface of said plate, said method comprising the steps of rendering solely said areas conductive; electrophoretically depositing ferrite material out of liquid organic media upon said areas to form simultaneously a like plurality of ferrite cores thereon; and heating said cores and plate to sinter said cores and bond same to said plate.

4. The method of producing an information storage array which comprises the steps of treating an exposed surface of an electrically non-conductive plate with a conductive solution to render said surface conductive; coating portions of said surface with a non-conductive lacquer in such manner that a plurality of physically separated areas remain lacquer-free; electrophoretically depositing ferrite material out of a liquid organic medium on said areas to form sumultaneously a like plurality of ferrite cores thereon; and heating said cores and said plate to sinter said cores and bond same to said plate.

References Cited in the file of this patent

UNITED STATES PATENTS

| | | |
|---|---|---|
| 1,897,902 | Harsanyi | Feb. 14, 1933 |
| 2,213,969 | Ruben | Sept. 10, 1940 |
| 2,214,973 | Rose | Sept. 17, 1940 |
| 2,215,166 | Sumner | Sept. 17, 1940 |
| 2,321,439 | Verwey | June 8, 1943 |
| 2,452,529 | Snoek | Oct. 26, 1948 |
| 2,452,530 | Snoek | Oct. 26, 1948 |
| 2,452,531 | Snoek | Oct. 26, 1948 |
| 2,495,630 | Dorst | Jan. 24, 1950 |
| 2,662,852 | Teal | Dec. 15, 1953 |
| 2,697,269 | Fuller | Dec. 21, 1954 |
| 2,700,150 | Wales | Jan. 18, 1955 |
| 2,739,085 | McBride | Mar. 20, 1956 |

FOREIGN PATENTS

| | | |
|---|---|---|
| 1,044,212 | France | June 17, 1953 |